(12) United States Patent
Kim et al.

(10) Patent No.: US 11,668,468 B2
(45) Date of Patent: Jun. 6, 2023

(54) PARTITION WALL ASSEMBLY FOR STOVE

(71) Applicant: Eun Mi Hwang, Wonju-si (KR)

(72) Inventors: Tae Hwan Kim, Wonju-si (KR); Eun Mi Hwang, Wonju-si (KR)

(73) Assignee: Eun Mi Hwang

( * ) Notice: Subject to any disclaimer, the term of this patent is extended or adjusted under 35 U.S.C. 154(b) by 387 days.

(21) Appl. No.: 17/135,653

(22) Filed: Dec. 28, 2020

(65) Prior Publication Data
US 2021/0285648 A1    Sep. 16, 2021

(30) Foreign Application Priority Data

Mar. 16, 2020 (KR) ........................ 10-2020-0031788

(51) Int. Cl.
*F24B 1/20* (2006.01)
*A47J 37/07* (2006.01)
(Continued)

(52) U.S. Cl.
CPC ........... *F24B 1/205* (2013.01); *A47J 37/0763* (2013.01); *F24B 5/025* (2013.01); *F24B 1/003* (2013.01)

(58) Field of Classification Search
CPC .......... F24B 1/195; F24B 5/025; F24B 1/181; F24B 1/198; F24B 5/026; F24B 1/205;
(Continued)

(56) References Cited

U.S. PATENT DOCUMENTS 3,581,731 A * 6/1971 Schulze .............. A47J 37/0763
99/422
4,248,203 A * 2/1981 Willson ................ F24C 15/004
126/77

(Continued)

FOREIGN PATENT DOCUMENTS

| KR | 20-2010-0011008 | 11/2010 |
| KR | 20-0469514 | 10/2013 |
| KR | 20-0479870 | 3/2016 |

*Primary Examiner* — Alfred Basichas

(57) ABSTRACT

Disclosed herein is a partition wall assembly for a stove. The partition wall assembly for a stove includes a plurality of partition walls (100, 100a, 100b, 100c). Each of the partition walls includes: an outer panel (110) having first air intake holes (111a) formed at a lower portion thereof so that first air is induced; an inner panel (120) coupled to the inside of the outer panel (110), and having an air moving space (119) formed between the outer panel (110) and the inner panel (120) so that the first air induced through the first air intake holes (111a) moves in the air moving space (119) while temperature of the first air is elevated, and second air outlets (121b) formed at an upper portion thereof to discharge the second air with the elevated temperature toward fuel; and a pair of side coupling members (130) disposed at both sides of the outer panel (110) to couple the outer panel (110) and the inner panel (120) with each other. The inner panel (120) includes: an inner panel body (121) curved to have a predetermined curvature in a height direction; a lower inside coupling plate (122) extending from a lower portion of the inner panel body (121) to a predetermined area and coupled with the outer panel (110); and an upper inside coupling plate (123) extending from an upper portion of the inner panel body (121) to a predetermined area and coupled with the outer panel (110).

4 Claims, 6 Drawing Sheets

(51) Int. Cl.
*F24B 5/02* (2006.01)
*F24B 1/00* (2006.01)

(58) Field of Classification Search
CPC . F24B 1/003; A47J 37/0763; A47J 2037/0777
See application file for complete search history.

(56) References Cited

U.S. PATENT DOCUMENTS

| | | | |
|---|---|---|---|
| 6,425,387 B1* | 7/2002 | Rohback, Jr. | F24C 3/14 |
| | | | 126/152 A |
| 2014/0165993 A1* | 6/2014 | Ahmed | A47J 37/0704 |
| | | | 126/25 R |
| 2014/0238378 A1 | 8/2014 | Scott | |
| 2022/0090791 A1* | 3/2022 | Hwang | F24B 3/00 |
| 2022/0178545 A1* | 6/2022 | Hale | F24B 1/195 |
| 2022/0357039 A1* | 11/2022 | Hwang | F24B 3/00 |

* cited by examiner (a)

(b)

PARTITION WALL ASSEMBLY FOR STOVE

CROSS-REFERENCE TO RELATED APPLICATIONS

This patent application claims priority under 35 U.S.C. § 119 to Korean Patent Application No. 10-2020-0031788 filed on Mar. 16, 2020, the entire contents of which are incorporated by reference herein.

TECHNICAL FIELD

The present invention relates to a partition wall assembly for a stove, and more particularly, to a partition wall assembly for a stove, which can induce complete combustion of fuel loaded in the stove so as to adjust a size if needed.

BACKGROUND

With enforcement of the five-day work week and improvement of the income level, the number of people who enjoy camping on weekends is increasing, and so, the demand of camping supplies is also increasing.

Out of such camping supplies, a brazier is used to heat around the brazier or to cook food by burning firewood or fuel outdoors.

A conventional stove includes a main body having a combustion space for burning fuel, such as firewood or charcoal, a grill put on the main body, and an ash tray disposed below the main body to receive ash generated after the combustion of fuel. Additionally, a partition wall surrounds the stove in order to block wind.

The conventional stove induces outdoor air from below fuel when the fuel, such as wood or charcoal, is put in. When a user ignites below the fuel, the entire fuel is wrapped in flames.

In case of the conventional stove, because outdoor air is introduced below the fuel just once, a sufficient oxygen necessary for burning fuel is not supplied. So, the conventional brazier causes incomplete combustion since the fuel burns just once.

The incompletely burnt combustion gas generates not only hydrogen and carbon dioxide but also carbon monoxide due to lack of oxygen, and lowers thermal efficiency per unit fuel in comparison with complete combustion. The conventional brazier has a disadvantage in that temperature of fire is low, food cooking time increases, and fuel consumption is also increased since thermal efficiency is low.

Meanwhile, the partition wall surrounding the upper portion of the stove may cause thermal transformation, such as shrivel of the surface by heat, when being used repeatedly for a long time since meeting heat of high temperature generated from the fuel.

SUMMARY

Accordingly, the present invention has been made to solve the above-mentioned problems occurring in the prior arts, and it is an object of the present invention to provide a partition wall assembly for a stove, which supplies oxygen to fuel burning in the stove twice so as to induce complete combustion.

It is another object of the present invention to provide a partition wall assembly for a stove, which can minimize thermal transformation by heat generated through combustion of fuel.

It is a further object of the present invention to provide a partition wall assembly for a stove, which can vary the size if necessary.

It is a still further object of the present invention to provide a partition wall assembly for a stove, which can stably maintain its assembled state even though external shock is applied.

To accomplish the above object, according to the present invention, there is provided a partition wall assembly for a stove including a plurality of partition walls which are assembled with one another to surround the stove.

Here, each of the partition walls includes: an outer panel having first air intake holes formed at a lower portion thereof so that first air is induced; an inner panel coupled to the inside of the outer panel, and having an air moving space formed between the outer panel and the inner panel so that the first air induced through the first air intake holes moves in the air moving space while temperature of the first air is elevated, and second air outlets formed at an upper portion thereof to discharge the second air with the elevated temperature toward fuel; and a pair of side coupling members disposed at both sides of the outer panel to couple the outer panel and the inner panel with each other.

The inner panel includes: an inner panel body curved to have a predetermined curvature in a height direction; a lower inside coupling plate extending from a lower portion of the inner panel body to a predetermined area and coupled with the outer panel; and an upper inside coupling plate extending from an upper portion of the inner panel body to a predetermined area and coupled with the outer panel.

As described above, the partition wall assembly according to the present invention can vary its size according to sizes of stoves by the partition walls assembled with one another.

Moreover, the partition wall assembly according to the present invention can reduce its occupied space when being stored or carried since the partition walls are disassembled from one another.

Furthermore, the partition wall assembly according to the present invention can induce complete combustion to minimize thermal efficiency per unit fuel since supplying not only the outdoor air supplied from below the fuel but also second air of elevated temperature above the fuel.

Additionally, the partition wall assembly according to the present invention provides a simple coupling process and can maintain its assembled state stably even though external power or repeated shock is applied since the neighboring partition walls are diagonally fit and coupled with one another in the dual structure by the side slope coupling wings, the male coupling brackets and the female coupling brackets disposed at both sides of the partition walls.

In addition, the partition wall assembly according to the present invention can transfer heat to the entire area evenly since the inner panel is formed to have the curved surface, so as to minimize thermal transformation.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, preferred embodiments of the present invention will now be described in detail with reference to the attached drawings, in which like reference numbers denote corresponding parts throughout the drawings.

The terms "comprising" and "including" in the discussion directed to the present invention and the claims are used in an open-ended fashion and thus should be interrupted to mean "including", but not limited thereto.

Figure 1:
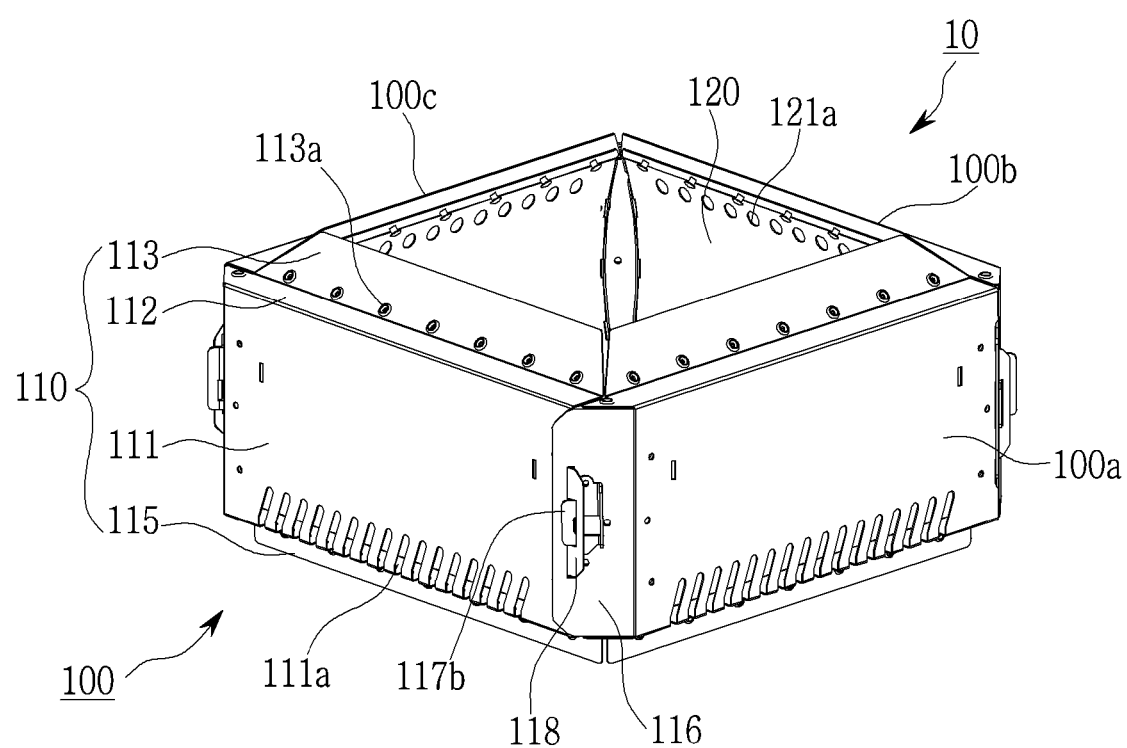
FIG. 1 is a perspective view showing a structure of a partition wall assembly according to the present invention.
Figure 2:
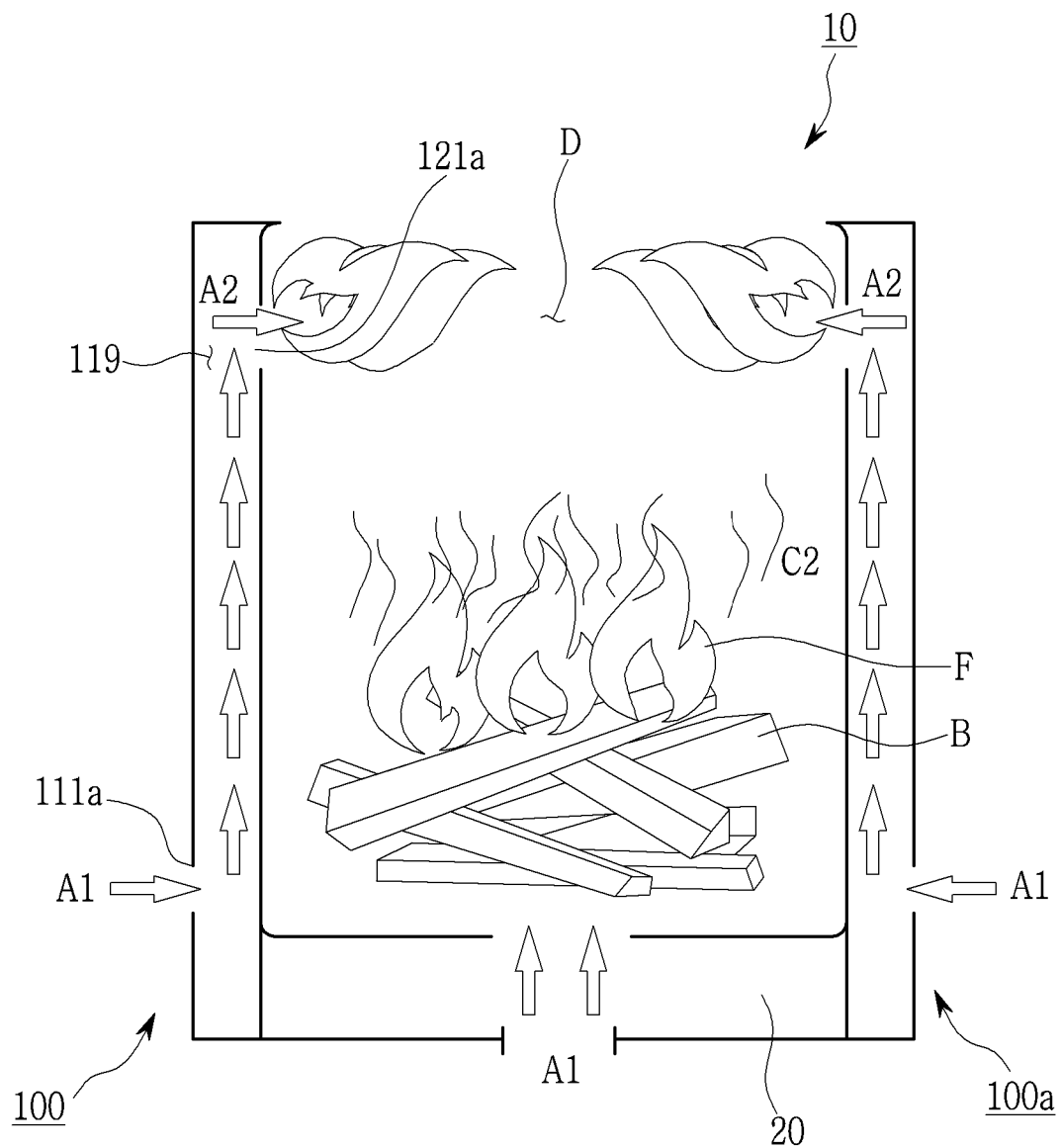
FIG. 2 is a schematic diagram showing a fuel combustion mechanism of the partition wall assembly according to the present invention.

FIG. 1 is an exemplary view showing an assembled state of a partition wall assembly 10 according to the present invention, and FIG. 2 is a schematic diagram showing a combustion mechanism when the partition wall assembly 10 is coupled to a stove 20.

The partition wall assembly 10 according to the present invention includes a plurality of partition walls 100, 100a, 100b and 100c, and a size and a shape of the partition wall assembly 10 are determined when the partition walls 100, 100a, 100b and 100c are selectively coupled if needed.

For an example, as shown in FIG. 1, the four partition walls 100, 100a, 100b and 100c are assembled to form a rectangle, or the three partition walls 100, 100a and 100b are assembled to form a triangle. Besides the above, five or more partition walls 100, 100a, 100b, 100c, . . . are assembled to form the partition wall assembly 10 with various sizes and shapes.

The partition walls 100, 100a, 100b and 100c are coupled with one another to form a combustion space (D) in which fuel (B) burns. As shown in FIG. 2, the partition wall assembly 10 is arranged to surround an upper portion of the stove 20 on which the fuel (B) is loaded. The partition wall assembly 10 according to the present invention surrounds the stove 20 to form the combustion space (D) in which the fuel (B) burns and supplies air twice so that the fuel (B) can attain complete combustion.

The fuel (B) which is loaded in the stove 20 receives the first air (A1) from a lower portion of the stove 20 to carry out the first combustion.

In the meantime, the first air (A1) introduced through first air intake holes 111a outside the partition walls 100, 100a, 100b and 100c moves upwards along an air moving space 119 inside the partition walls 100, 100a, 100b and 100c, and then, is discharged to the combustion space (D) through second air outlets 121b formed inside the partition walls 100, 100a, 100b and 100c.

The first air (A1) moving along the air moving space 119 moves upwards while receiving heat of the combustion space (D) and its temperature rises. The heated second air (A2) is discharged to the combustion space (D) through the second air outlets 121b, and is supplied to flames (F) and combustion gas (C2) formed by the first air (A1), so that second combustion of the fuel (B) is carried out. The second combustion induces complete combustion of the fuel.

That is, the partition wall assembly 10 according to the present invention moves along the air moving space 118 inside the partition walls 100, 100a, 100b and 100c, and discharges the second air (A2) with the elevated temperature toward the fuel (B), so that second combustion of the fuel (B) is carried out. The second combustion induces complete combustion of the fuel.

Therefore, a heating value per unit fuel is increased and time to heat food is reduced due to high thermal efficiency.

The partition walls 100, 100a, 100b and 100c are assembled and used to be suitable for the size of the used stove 20. Because the partition walls 100, 100a, 100b and 100c have the same structure, only the first partition wall 100 will be described in detail.

Figure 3:
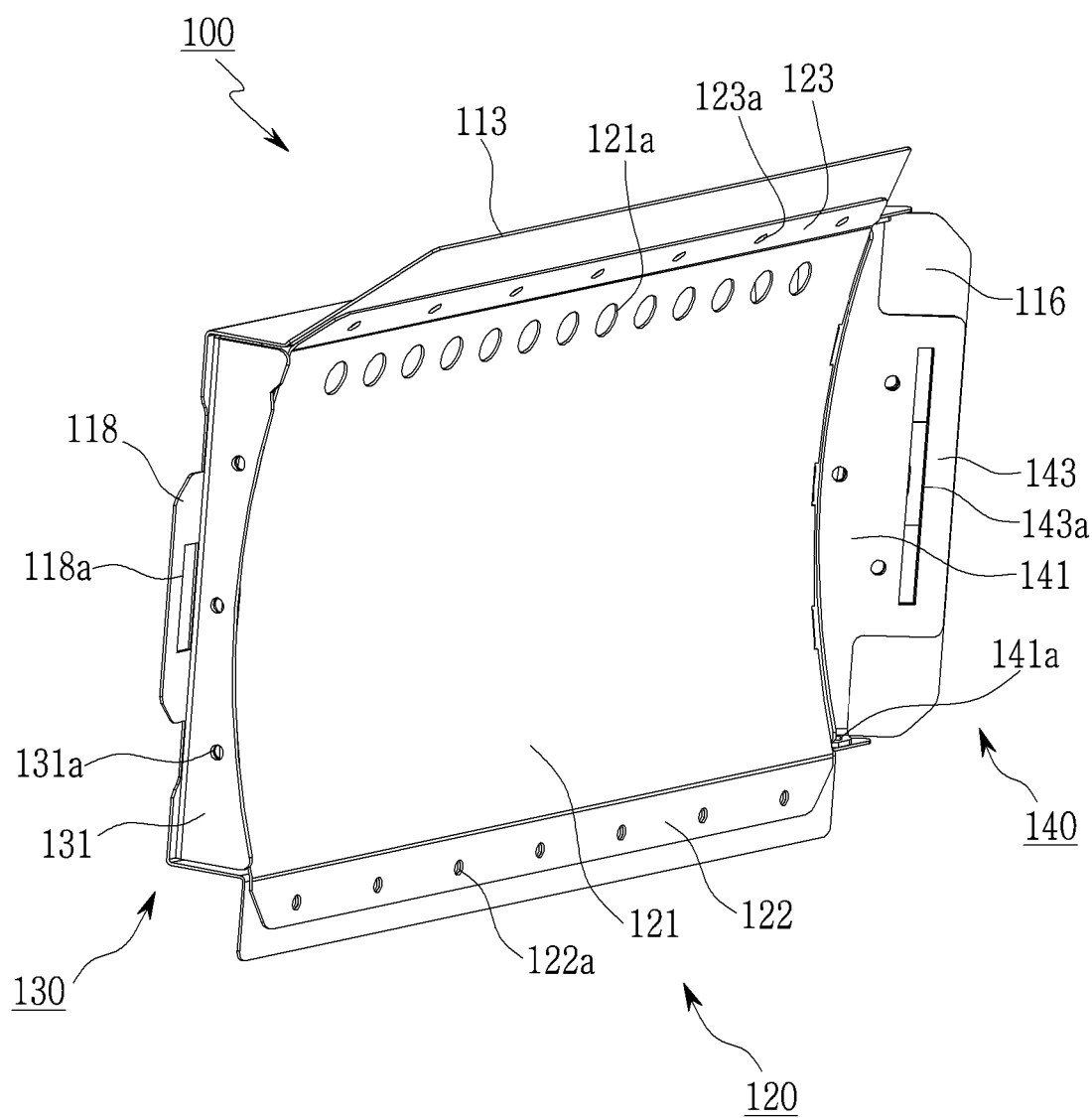
FIG. 3 is a perspective view showing a structure of a partition wall of the partition wall assembly according to the present invention.
Figure 4:
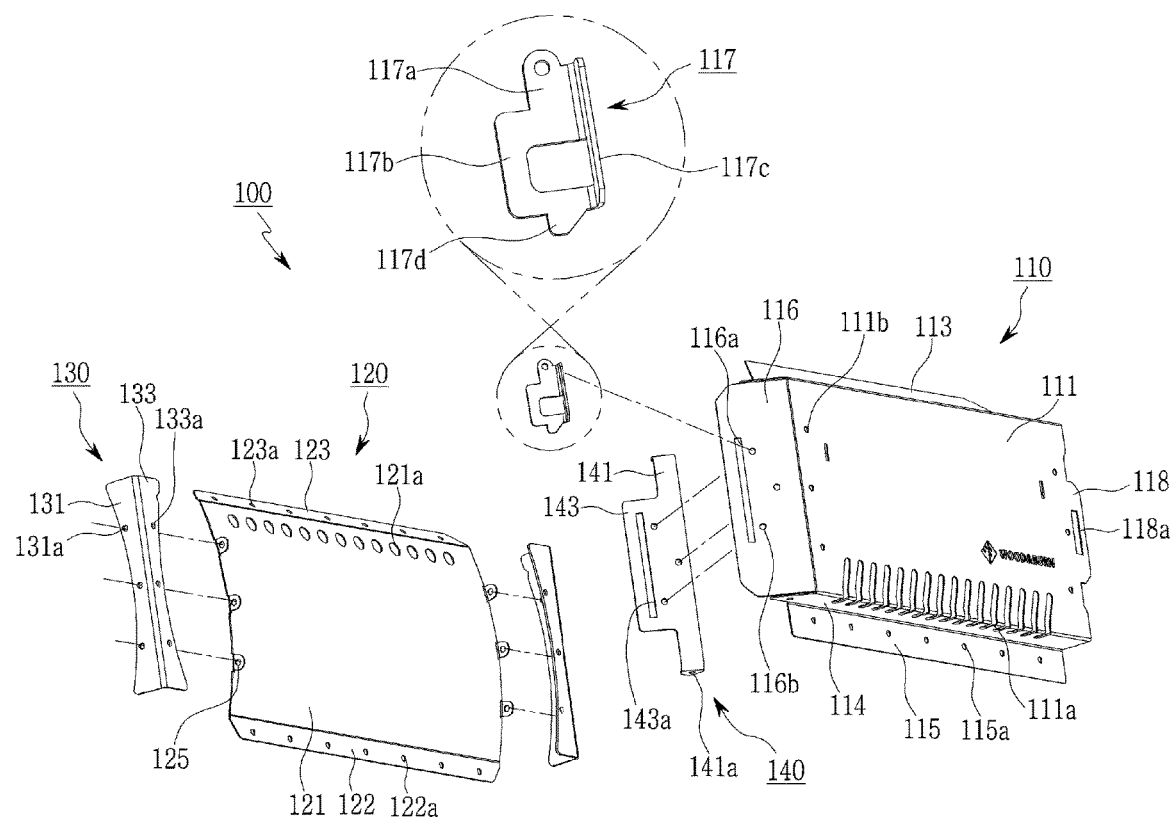
FIG. 4 is an exploded perspective view showing the structure of the partition wall of the partition wall assembly according to the present invention.

FIG. 3 is a perspective view showing a structure of the first partition wall 100, and FIG. 4 is an exploded perspective view showing the structure of the first partition wall 100.

As shown in the drawings, the first partition wall 100 includes an outer panel 110, an inner panel 120 coupled to the inside of the outer panel 110 to form the air moving space 119 between the outer panel 110 and the inner panel 120, a pair of side coupling members 130 disposed at both sides of the outer panel 110 to couple the outer panel 110 to the inner panel 120, and a reinforcing member 140 coupled to one side of the outer panel 110.

The outer panel 110 forms an outer wall surface of the first partition wall 100. The outer panel 110 may be formed in a housing shape of which the front is open. The outer panel 110 includes an outer panel body 111 arranged vertically, an upper surface 112 disposed horizontally on an upper portion of the outer panel body 111, a lower surface 114 disposed horizontally on a lower portion of the outer panel body 111, a side slope coupling wing 116 extending from one side of the outer panel body 111 to be inclined, a male coupling bracket 117 disposed on the upper surface of the side slope coupling wing 116, and a female coupling bracket 118 protruding from the other side of the outer panel body 111.

The outer panel body 111 is in a plate form having a predetermined area. A plurality of the first air intake holes 111a are formed at the lower portion of the outer panel body 111 to perforate through the outer panel body 111. The first air intake holes 111a induces the first air (A1) from the outside to the air moving space 118 between the outer panel 110 and the inner panel 120.

A plurality of first side coupling holes 111b are formed in the plate surfaces of both sides of the outer panel body 111. The first side coupling holes 111b are arranged on the same axis as second side coupling holes 133a of the side coupling members 130, and then, fastening members, such as bolts, are coupled.

Figure 6:
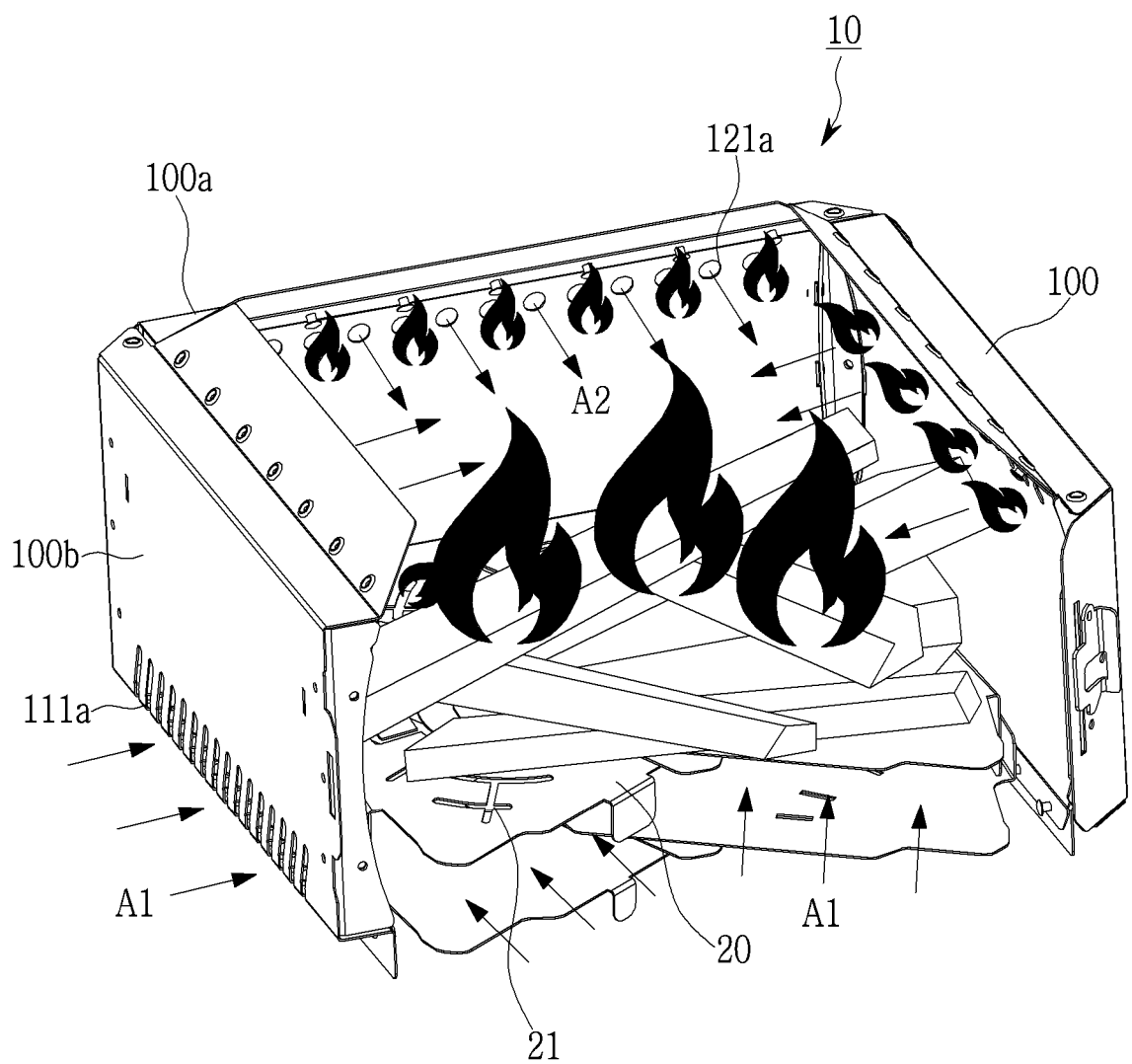
FIG. 6 is an exemplary view showing a combustion process of the partition wall assembly according to the present invention.

A flame guide wing 113 of a predetermined area is formed on the upper surface 112 to be inclined inwards at a predetermined angle. As shown in FIG. 6, the flame guide wing 113 guides the second air (A2), which is discharged from the second air outlets 121b of the inner panel 120, not to face upwards but to face the inside of the combustion space (D). Therefore, the flames formed by meeting the second air (A2) are formed inside the flame guide wing 113, but is not discharged to the outside. That is, the flames do spread but are collected to the center.

As shown in FIG. 1, a plurality of first upper coupling holes 113a are formed at a lower portion of the flame guide wing 113 in a longitudinal direction at regular intervals. A plurality of second upper coupling holes 121a of the inner panel 120 are arranged on the same axis as the first upper coupling holes 113a, and fastening means, such as bolts, are coupled thereto.

The lower surface 114 is bent horizontally at the lower portion of the outer panel body 111. Here, as shown in FIG. 4, the first air intake holes 111a are formed in the shape of "L" in a boundary area between the outer panel body 111 and the lower surface 114. Therefore, the first air (A1) can be induced from two directions.

Then, an inflow angle of the first air (A1) can be smooth by the shape of the first air intake holes 111a. Because of the smooth inflow angle of the first air (A1), intake resistance is reduced, and so, the first air (A1) is induced more smoothly.

The lower surface 114 has a lower outside coupling plate 115 extending vertically to a predetermined area. The lower outside coupling plate 115 is arranged to touch a lower inside coupling plate 122 of the inner panel 120 so as to be coupled with the inner panel 120. A plurality of first lower coupling holes 115a are disposed in the plate surface of the lower outside coupling plate 115 in the longitudinal direction, are arranged on the same axis as second lower coupling holes 122a of the lower inside coupling plate 122, and are coupled by a coupling member.

The side slope coupling wing 116, the male coupling bracket 117 and the female coupling bracket 118 are fixed in their positions when the partition walls 100, 100a, 100b and 100c neighboring one another are assembled with one another. The side slope coupling wing 116 is formed at one side of the outer panel body 111 to be inclined inwards at a predetermined angle. A female coupling bracket insertion hole 116a is formed in the plate surface of the side slope coupling wing 116 in a height direction.

As shown in FIG. 1, the side slope coupling wing 116 meets the female coupling bracket 118 protruding toward the other side of the partition walls 100, 100a, 100b and 100c neighboring one another to form an area and an inclination angle that the female coupling bracket 118 can be fit when the partition walls 100, 100a, 100b and 100c neighboring one another are assembled with one another.

The male coupling bracket 117 is coupled to the upper surface of the side slope coupling wing 116, and is coupled with the female coupling bracket 118. As shown in FIG. 4, the male coupling bracket 117 includes a bracket body 117a coupled to the side slope coupling wing 116, a coupling protrusion 117b protruding forwards from the bracket body 117a, a handgrip 117c formed at the rear of the bracket body 117a to be bent vertically, and a retaining jaw 117d disposed at the front of the bracket body 117a.

Figure 5A:
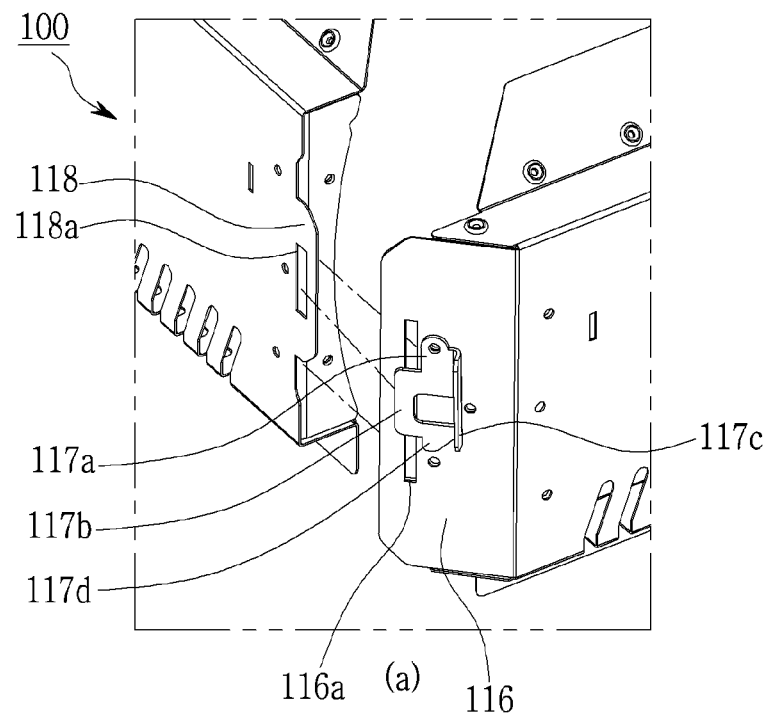
FIGS. 5A and 5B are exemplary views showing an assembly structure of the partition wall assembly according to the present invention.
Figure 5B:
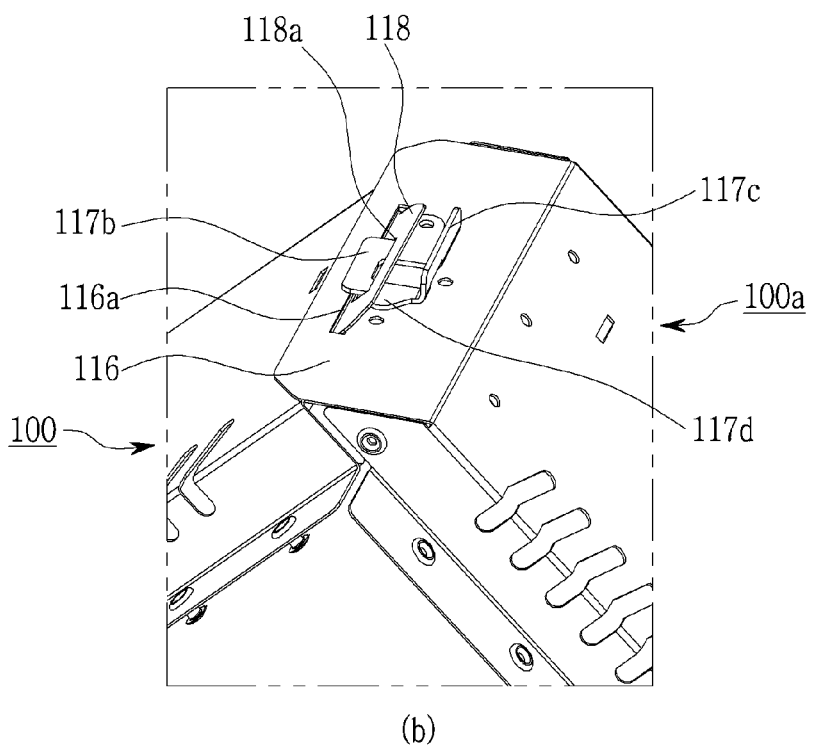

As shown in FIG. 5A, the bracket body 117a is coupled with the plate surface of the side slope coupling wing 116 by a fastening member, such as a bolt. In this instance, the coupling protrusion 117b protrudes from the front of the bracket body 117a to be put on an upper portion of the female coupling bracket insertion hole 116a. The coupling protrusion 117b is formed to correspond to a width of a protrusion insertion hole 118a of the female coupling bracket 118, and is inserted and coupled into the protrusion insertion hole 118a as shown in FIG. 5B.

When the user assembles the partition walls 100, 100a, 100b and 100c with one another, the user grasps the handgrip 117c with the hand and adjusts a coupling angle in a diagonal direction so that the male coupling bracket 117 and the female coupling bracket 118 can be coupled with each other easily. The handgrip 117c is formed such that the rear of the bracket body 117a is bent vertically.

The retaining jaw 117d is formed at a boundary area between the bracket body 117a and the coupling protrusion 117b. As shown in FIG. 5B, the retaining jaw 117d supports the female coupling bracket 118 in contact with the female coupling bracket 118 so as to fix the coupling position of the female coupling bracket 118 when the female coupling bracket 118 and the male coupling bracket 117 are coupled with each other.

The female coupling bracket 118 is formed at the other side of the outer panel body 111 to protrude outwards, and is caught and coupled to the side slope coupling wing 116 and the male coupling bracket 117 of the neighboring partition walls 100, 100a, 100b and 100c. The female coupling bracket 118 has a height corresponding to the female coupling bracket insertion hole 116a and is inserted into the female coupling bracket insertion hole 116a. The protrusion insertion hole 118a to which the coupling protrusion 117b is inserted is formed in the plate surface of the female coupling bracket 118.

The inner panel 120 is coupled to the inside of the outer panel 110, and the air moving space 119 is formed between the inner panel 120 and the outer panel 110. As shown in FIG. 4, the inner panel 120 includes an inner panel body 121 arranged inside the outer panel body 111, a lower inside coupling plate 122 extending from a lower portion of the inner panel body 121, an upper inside coupling plate 123 extending from an upper portion of the inner panel body 121, and a plurality of side coupling rings 125 formed at both sides of the inner panel body 121 to protrude toward the outer panel 110.

The inner panel body 121 is formed to have an area corresponding to the outer panel body 111. Here, as shown in FIG. 3, the inner panel body 121 is curved to have a curvature protruding toward the outer panel body 111 in a height direction. The reason that the inner panel body 121 is formed to be curved is to minimize thermal transformation by heat generated when the fuel (B) burns. According to circumstances, the inner panel body 121 may be curved to have a curvature in a width direction.

When heat is transferred by flames, the curved-shaped inner panel body 121 receives heat uniformly in all areas. Therefore, thermal transformation, such as shrivel of the inner panel body 121 by heat, can be minimized.

A plurality of second air outlets 121b are formed at the upper portion of the inner panel body 121 in the width direction to penetrate through the inner panel body 121. As shown in FIG. 4, the second air outlets 121b discharge the second air (A2), which is moved upwards along the air moving space 119 through the first air intake holes 111a, toward the combustion space (D).

The first air (A1) introduced into the air moving space 119 through the first air intake holes 111a receives heat generated from the combustion space (D) to raise temperature while ascending upwards. The second air (A2) with the elevated temperature is supplied to the combustion space (D) as the fuel (B) and combustion gas (C2) so that second combustion of the fuel (B) is carried out.

The lower inside coupling plate 122 is coupled with the lower outside coupling plate 115 of the outer panel 110, and the upper inside coupling plate 123 is coupled with the flame guide wing 113 of the outer panel 110. As shown in FIG. 4, the side coupling rings 125 are formed at both sides of the inner panel body 121 to protrude rearwards, and is coupled to ring coupling holes 131a of the side coupling members 130.

The side coupling members 130 are arranged at both sides of the outer panel 110 and the inner panel 120 so that the outer panel 110 and the inner panel 120 are spaced apart from each other at a predetermined interval. As shown in FIG. 4, the side coupling members 130 are formed such that an inner panel coupling face 131 and an outer panel coupling face 133 are bent in the form of "¬".

The inner panel coupling face 131 is arranged to touch the side coupling rings 125 of the inner panel 120, and has a plurality of ring coupling holes 131a formed on the panel surface to be located on the same axis as the side coupling rings 125. The outer panel coupling face 133 is arranged to touch the inner surface of the outer panel body 111 and has a plurality of second side coupling holes 133a arranged on the same axis as the first side coupling holes 111b.

Meanwhile, as shown in FIG. 3, the reinforcing member 140 is coupled to the inside of the side slope coupling wing 116. The reinforcing member reinforces strength to prevent the side slope coupling wing 116 from being bent by coupling and restraining power when the female coupling brackets 118 of the partition walls 100, 100a, 100b and 100c neighboring the side slope coupling wing 116 are coupled with one another.

The reinforcing member 140 includes a wing coupling plate 141 coupled to the inside of the side slope coupling wing 116, and an inner bracket insertion plate 143 protruding at the front end of the wing coupling plate 141 and arranged at a lower portion of the female coupling bracket insertion hole 116a.

The wing coupling plate 141 has a height corresponding to a height of the side slope coupling wing 116, and has a pair of body coupling ribs 141a formed at upper and lower portions thereof to be bent. As shown in FIG. 3, the body coupling ribs 141a are respectively coupled to the upper surface 112 and the lower surface 114 of the outer panel 110 so as to fix the position of the reinforcing member 140.

The inner bracket insertion plate 143 has an inner female coupling bracket insertion hole 143a formed in the plate surface thereof on the same axis as the female coupling bracket insertion hole 116a. Therefore, the female coupling brackets 118 of the neighboring partition walls are inserted into the inner female coupling bracket insertion holes 143a and the female coupling bracket insertion holes 116a at the same time.

When the user assembles the partition walls 100, 100a, 100b and 100c on the spot according to the size of the stove 20, the partition wall assembly 10 according to the present invention can be used.

As shown in FIG. 4, the partition walls 100, 100a, 100b and 100c are assembled with one another after the inner panel 120 is arranged inside the outer panel 110 and the side coupling members 130 are arranged at both sides of the outer panel 110 and the inner panel 120. After that, the male coupling bracket 117 is coupled to the outside of the side slope coupling wing 116 of the outer panel 110, and the reinforcing member 140 is coupled to the inside of the side slope coupling wing.

Such partition walls 100, 100a, 100b and 100c are assembled with one another when the touching sides are fit to one another as shown in FIG. 5.

When a pair of the neighboring partition walls 100, 100a, 100b and 100c are coupled with each other, as shown in FIG. 5A, the user arranges the first partition wall 100 and the second partition wall 100a at desired positions, and couples the female coupling bracket 118 of the first partition wall 100 to the side slope coupling wing 116 of the second partition wall 100a. The user grasps the handgrip 117c of the male coupling bracket 117 with the hand, diagonally arranges the first partition wall 100 and the second partition wall 100a to be inclined to each other, and then, insert the female coupling bracket 118 of the first partition wall 100 into the female coupling bracket insertion hole 116a of the side slope coupling wing 116 of the second partition wall 100a to be inclined. After that, the user presses the female coupling bracket 118 inserted into the female coupling bracket insertion hole 116a toward the male coupling bracket 117 of the second partition wall 100a so that the coupling protrusion 117b of the male coupling bracket 117 is inserted and fit into the protrusion insertion hole 118a.

Then, as shown in FIG. 5B, the female coupling bracket 118 of the first partition wall 100 and the side slope coupling wing 116 and the male coupling bracket 117 of the second partition wall 100a are retained to each other to intercross each other. That is, in the state where the female coupling bracket 118 is first inserted and fit into the female coupling bracket insertion hole 116a of the side slope coupling wing 116, the coupling protrusion 117b of the male coupling bracket 117 is second inserted and fit into the protrusion insertion hole 118a of the female coupling bracket 118.

Because the female coupling bracket 118 of the first partition wall 100 and the male coupling bracket 117 of the second partition wall 100a are retained and coupled with each other in a dual structure and the female coupling bracket 118 is caught to the retaining jaw 117d to be fixed in position, even though vibration or shock is applied in the vertical direction or in the lateral direction, the coupled state between the first partition wall 100 and the second partition wall 100a can be maintained stably.

In the same way, the third partition wall 100b is coupled to the second partition wall 100a and the first partition wall 100 is coupled to the other side of the third partition wall 100b, so that the partition wall assembly 10 of a triangular shape can be formed. As shown in FIG. 1, if the four partition walls 100, 100a, 100b and 100c are assembled, the partition wall assembly 10 of a rectangular shape can be formed.

Meanwhile, if the user wants to disassemble the first and second partition walls 100 and 100a which are assembled, the user grasps and rotates the first partition wall 100 or the second partition wall 100a to arrange it diagonally, separates the coupling protrusion 117b of the second partition wall 100a from the protrusion insertion hole 118a of the first partition wall 100, and separate the female coupling bracket 118 of the first partition wall 100 from the female coupling bracket insertion hole 116a of the second partition wall 100a.

In the meantime, FIG. 6 illustrates an example of use of the partition wall assembly 10 assembled in the rectangular shape.

As shown in the drawing, the fuel (B) is loaded on the upper surface of the stove 20, and the partition wall assembly 10 is arranged to surround the stove 20. After that, the user ignites fire after putting the fuel (B) on the stove (20). Then, the first air (A1) is induced through an air inlet 21 of the stove 20, and the fuel (B) burns first.

The first air (A1) is induced into the air moving space 119 between the outer panel 110 and the inner panel 120 through the first air intake holes 111a of the partition walls 100, 100a, 100b and 100c, and moves upwards. In this process, temperature of the first air rises by heat generated during the combustion process of the fuel.

The second air (A2) with elevated temperature is supplied to the combustion space (D) through the second air outlets 127 of the inner panels 120 and meets first burnt flames and combustion gas. Therefore, the flames and the combustion gas burn second so that complete combustion is induced. Due to the complete combustion, temperature of the flames rises and thermal efficiency increases.

As described above, the partition wall assembly according to the present invention can vary its size according to sizes of stoves by the partition walls assembled with one another.

Moreover, the partition wall assembly according to the present invention can reduce its occupied space when being stored or carried since the partition walls are disassembled from one another.

Furthermore, the partition wall assembly according to the present invention can induce complete combustion to minimize thermal efficiency per unit fuel since supplying not only the outdoor air supplied from below the fuel but also second air of elevated temperature above the fuel.

Additionally, the partition wall assembly according to the present invention provides a simple coupling process and can maintain its assembled state stably even though external power or repeated shock is applied since the neighboring partition walls are diagonally fit and coupled with one another in the dual structure by the side slope coupling wings, the male coupling brackets and the female coupling brackets disposed at both sides of the partition walls.

In addition, the partition wall assembly according to the present invention can transfer heat to the entire area evenly since the inner panel is formed to have the curved surface, so as to minimize thermal transformation.

The technical thoughts of the present invention have been described hereinafter.

It is to be appreciated that those skilled in the art can change or modify the embodiments from the above description. Although it is not clearly illustrated or described herein, it is to be appreciated that those skilled in the art can change or modify the embodiments from the above description without departing from the scope and spirit of the present invention. While the present invention has been described with reference to the particular illustrative embodiments, it is not to be restricted by the embodiments but only by the appended claims.

What is claimed is:

1. A partition wall assembly for a stove, comprising a plurality of partition walls which are assembled with one another to surround the stove,
    wherein each of the partition walls comprises:
        an outer panel having first air intake holes formed at a lower portion thereof so that first air is induced;
        an inner panel coupled to the inside of the outer panel, and having an air moving space formed between the outer panel and the inner panel so that the first air induced through the first air intake holes moves in the air moving space while temperature of the first air is elevated, and second air outlets formed at an upper portion thereof to discharge the second air with the elevated temperature toward fuel; and
        a pair of side coupling members disposed at both sides of the outer panel to couple the outer panel and the inner panel with each other, and
    wherein the inner panel comprises:
        an inner panel body curved to have a predetermined curvature in a height direction;
        a lower inside coupling plate extending from a lower portion of the inner panel body to a predetermined area and coupled with the outer panel; and
        an upper inside coupling plate extending from an upper portion of the inner panel body to a predetermined area and coupled with the outer panel.

2. The partition wall assembly according to claim 1, wherein the outer panel comprises:
    an outer panel body formed to have a predetermined area, and having the air moving space formed therein and a plurality of first air intake holes formed at a lower portion thereof in a width direction;
    a flame guide wing formed on the upper surface of the outer panel body to be inclined inwards at a predetermined angle, guiding the second air, which is discharged from the second air outlets, to the fuel, and coupled with the upper inside coupling plate;
    a lower outside coupling plate extending from a lower portion of the outer panel body and coupled with the lower inside coupling plate;
    a side slope coupling wing extending from one side of the outer panel body to a predetermined area to be inclined and having a female coupling bracket insertion hole formed in the plate surface thereof;
    a male coupling bracket coupled to one side of the side slope coupling wing and having a coupling protrusion protruding toward the female coupling bracket insertion hole; and
    a female coupling bracket protruding from the other side of the outer panel body and inserted into the female coupling bracket insertion hole of a neighboring partition wall, and
    wherein the female coupling bracket has a protrusion insertion hole formed in the plate surface thereof so that the coupling protrusion of the neighboring partition wall is inserted into the protrusion insertion hole when the female coupling bracket is inserted into the female coupling bracket insertion hole of the neighboring partition wall.

3. The partition wall assembly according to claim 2, wherein the first air intake holes are formed in an "L" shape at the lower portion of the outer panel body bidirectionally.

4. The partition wall assembly according to claim 3, further comprising:
    a reinforcing member coupled to the inside of the side slope coupling wing to reinforce strength of the side slope coupling wing.

* * * * *